US011280733B2

(12) United States Patent
Kamihara et al.

(10) Patent No.: US 11,280,733 B2
(45) Date of Patent: Mar. 22, 2022

(54) AUTOMATIC ANALYZER

(71) Applicant: HITACHI HIGH-TECH CORPORATION, Tokyo (JP)

(72) Inventors: Kumiko Kamihara, Mito (JP); Tomonori Mimura, Kasama (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 15/808,375

(22) Filed: Nov. 9, 2017

(65) Prior Publication Data

US 2018/0128741 A1    May 10, 2018

Related U.S. Application Data

(63) Continuation of application No. 13/988,069, filed as application No. PCT/JP2011/073796 on Oct. 17, 2011, now abandoned.

(30) Foreign Application Priority Data

Nov. 17, 2010   (JP) ................................. 2010-256984

(51) Int. Cl.
  *G01N 21/59*   (2006.01)
  *G01N 35/00*   (2006.01)

(52) U.S. Cl.
  CPC ....... *G01N 21/59* (2013.01); *G01N 35/00613* (2013.01); *G01N 35/00663* (2013.01);
  (Continued)

(58) Field of Classification Search
  CPC ............. G01N 21/59; G01N 35/00613; G01N 35/00663; G01N 35/00732; G01N 2035/00851
  See application file for complete search history.

(56) References Cited

U.S. PATENT DOCUMENTS 4,750,133 A   6/1988   Eiskamp
4,873,633 A   10/1989  Mezei
(Continued)

FOREIGN PATENT DOCUMENTS

EP   1260818 A1   11/2002
EP   2068153 A2   6/2009
(Continued)

OTHER PUBLICATIONS

English Translation of International Preliminary Report on Patentability from International Patent Application No. PCT/JP2011/073796, transmitted Jun. 20, 2013.
(Continued)

*Primary Examiner* — Benjamin R Whatley
(74) *Attorney, Agent, or Firm* — Miles & Stockbridge, P.C.

(57) ABSTRACT

An automatic analyzer that allows appropriate setting of analytical parameters which incorporate batch-to-batch variations in reagents. The analytical parameters consist of fixed parameters and variable parameters. The fixed parameters include a reagent-dispensing quantity, a sample-dispensing quantity, measuring wavelength, and the like, each of which becomes a pivot for measurement of a sample, and parameters to be used are selected from an item code and bottle code assigned to a reagent bottle. The variable parameters include a linearity check value, a prozone check value, reaction limit absorbance, technical limits, first standard solution absorbance, variation allowable absorbance, and the like, each of which is associated with sample-measurement result checks. The automatic analyzer reads bar code information from the reagent bottle and adopts variable parameters of a corresponding version with the item code, the bottle code, and batch information relating to the reagent, as a key.

3 Claims, 5 Drawing Sheets

| ITEM A | | | | 105254 | 105252 | 101153 | 115235 | 132779 | 132779 | | |
|---|---|---|---|---|---|---|---|---|---|---|---|
| | REAGENT BATCH | | | | | | | | | | |
| VARIABLE PARAMETERS | FIRST STANDARD SOLUTION ABSORBANCE RANGE | MAX | 6000 | 7000 | 7000 | 7000 | 6000 | 6000 | | | |
| | | MIN | 5000 | 5000 | 6000 | 4000 | 3000 | 3000 | | | |
| | VARIATION ALLOWABLE ABSORBANCE | % | 20 | 25 | 22 | 20 | 20 | 23 | | | |
| | | Abs | 100 | 260 | 150 | 120 | 120 | 160 | | | |
| | SENSITIVITY ALLOWABLE ABSORBANCE | MAX | 300 | 820 | 850 | 800 | 890 | 900 | | | |
| | | MIN | 500 | 450 | 600 | 600 | 600 | 600 | | | |
| | CONVERGENCE ALLOWABLE ABSORBANCE | SD | 200 | 100 | 200 | 200 | 200 | 300 | | | |
| | CALIBRATION EXECUTION DATE | | JAN 2 | MAR 5 | MAY 11 | JULY 12 | AUG 31 | OCT 20 | | | |
| AFTER CALIBRATION CALCULATION RESULTS | FIRST STANDARD SOLUTION ABSORBANCE RANGE | Abs | 5750 | 6500 | 6600 | 6000 | 3800 | 5000 | | | |
| | VARIATION ALLOWABLE ABSORBANCE | % | 18 | 20 | 20 | 15 | 16 | 18 | | | |
| | | Abs | 80 | 100 | 100 | 100 | 110 | 100 | | | |
| | SENSITIVITY ALLOWABLE ABSORBANCE | Abs | 600 | 800 | 800 | 790 | 820 | 780 | | | |
| | CONVERGENCE ALLOWABLE ABSORBANCE | Abs | 150 | 180 | 80 | 150 | 100 | 200 | | | |

(52) U.S. Cl.
CPC . *G01N 35/00693* (2013.01); *G01N 35/00732* (2013.01); *G01N 2035/00673* (2013.01); *G01N 2035/00851* (2013.01)

(56) References Cited

U.S. PATENT DOCUMENTS

| | | | |
|---|---|---|---|
| 6,080,364 A | 6/2000 | Mimura | |
| 6,846,457 B1 * | 1/2005 | Tokiwa | G01N 35/00594 |
| | | | 422/63 |
| 7,674,430 B2 | 3/2010 | Ouchi et al. | |
| 7,732,212 B1 | 6/2010 | Nakata et al. | |
| 2006/0005640 A1 | 1/2006 | Osaka | |
| 2006/0281183 A1 * | 12/2006 | Sun | G01N 35/0092 |
| | | | 436/43 |
| 2007/0217949 A1 | 9/2007 | Mimura et al. | |
| 2007/0255756 A1 | 11/2007 | Satomura et al. | |
| 2008/0063570 A1 | 3/2008 | Fujino et al. | |
| 2009/0142231 A1 | 6/2009 | Shibuya et al. | |
| 2009/0222213 A1 | 9/2009 | Hamazumi et al. | |
| 2009/0269242 A1 | 10/2009 | Nozawa | |
| 2009/0292494 A1 | 11/2009 | Imai | |
| 2010/0022954 A1 | 1/2010 | Arbogast et al. | |
| 2011/0090066 A1 | 4/2011 | Yamaguchi | |
| 2011/0301917 A1 | 12/2011 | Kamihara et al. | |
| 2012/0000268 A1 * | 1/2012 | Li | G01N 35/00613 |
| | | | 73/1.01 |
| 2013/0266484 A1 | 10/2013 | Kamihara et al. | |
| 2015/0147819 A1 | 5/2015 | Pedrazzini | |
| 2017/0217027 A1 | 8/2017 | Boucard | |

FOREIGN PATENT DOCUMENTS

| | | | |
|---|---|---|---|
| EP | 2116850 A1 | 11/2009 | |
| JP | 05-264535 A | 10/1993 | |
| JP | 08-262029 A | 10/1996 | |
| JP | 2005242692 A | 9/2005 | |
| JP | 2009-133796 A | 6/2009 | |
| JP | 2009-204448 A | 9/2009 | |
| JP | 2010055498 A | 3/2010 | |
| JP | 2010-238188 A | 10/2010 | |
| JP | 2012107985 A | 6/2012 | |
| JP | 2015518968 A | 7/2015 | |
| JP | 2016068233 A | 5/2016 | |
| JP | 2016198839 A | 12/2016 | |
| WO | WO 2009/142087 A1 | 11/2009 | |
| WO | WO 2010/073479 A1 | 7/2010 | |
| WO | WO-2010073479 A1 * | 7/2010 | ....... G01N 35/00613 |

OTHER PUBLICATIONS

Extended European Search Report dated Sep. 6, 2017 for related European Application No. 11841265.9.

* cited by examiner

39 ANALYTICAL PARAMETERS

| | ITEM NAME | SAMPLE TYPE |
|---|---|---|
| 1 | AST | SERUM |
| 2 | ALT | SERUM |
| 3 | ALP | SERUM |
| 4 | Ca | SERUM |
| 5 | CRE | SERUM |
| 6 | CRP | SERUM |
| 7 | Glu | SERUM |
| 8 | GA | SERUM |
| 9 | TP | SERUM |
| 10 | T-BIL | SERUM |
| 11 | UN | SERUM |
| | | SERUM |
| 102 | IgA | SERUM |
| | | URINE |
| 108 | IgG | SERUM |
| | | URINE |
| 119 | Na | SERUM |
| | | URINE |

40 ANALYSIS  CALIB  [RANGE | MISC]   41 CHECK VALUE

⊙ CURRENT  ○ STDBY 1  ○ STDBY 2  ○ STDBY 3  ○ STDBY 4  ○ STDBY 5   42

REAGENT INFO
[ITEM CODE] 0000    [BOTTLE CODE] 00352
[REAGENT BATCH] R1:02354 R3:02354
[REAGENT SEQUENCE] R1:003 R3:61
[USAGE DURATION] 20XX/10     — 43

44

CALIBRATION CHECK
 CONVERGENCE ALLOWABLE ABSORBANCE   [3200] Abs.
 VARIATION ALLOWABLE ABSORBANCE       [98] % [20000] Abs.
 SENSITIVITY ALLOWABLE ABSORBANCE    [18000] Abs. ~ [20000] Abs.
 FIRST STANDARD SOLUTION ABSORBANCE [5000] Abs. ~ [5500] Abs.

DATA CHECK
 PROZONE CHECK VALUE  [0] [32000] [21] [25] [33] [37] [INSIDE] [100] [100]
 LINEARITY CHECK VALUE  [10] % [30] % [60] [60]
 REACTION LIMIT ABSORBANCE  [18000] Abs. [INCREASE]
 TECHNICAL LIMITS (MEASURED DATA)   [-99999] [1500]
 REACTION PROCESS APPROXIMATION FACTOR (K)  [5000] [5500]

46 — [DATA EDIT]

48 ITEM A

| | | | | | | | | | |
|---|---|---|---|---|---|---|---|---|---|
| | REAGENT BATCH 47 | | 105254 | 105252 | 101153 | 115235 | 132779 | 132779 | ... |
| VARIABLE PARAMETERS | FIRST STANDARD SOLUTION ABSORBANCE RANGE | MAX | 6000 | 7000 | 7000 | 7000 | 6000 | 6000 | ... |
| | | MIN | 5000 | 5000 | 6000 | 4000 | 3000 | 3000 | ... |
| | VARIATION ALLOWABLE ABSORBANCE | % | 20 | 25 | 22 | 20 | 20 | 23 | ... |
| | | Abs | 100 | 200 | 150 | 120 | 120 | 160 | ... |
| | SENSITIVITY ALLOWABLE ABSORBANCE | MAX | 800 | 820 | 850 | 800 | 890 | 900 | ... |
| | | MIN | 500 | 450 | 600 | 600 | 600 | 600 | ... |
| | CONVERGENCE ALLOWABLE ABSORBANCE | SD | 200 | 100 | 200 | 200 | 200 | 300 | ... |
| 49 | CALIBRATION EXECUTION DATE | | JAN 2 | MAR 5 | MAY 11 | JULY 12 | AUG 31 | OCT 20 | ... |
| AFTER-CALIBRATION CALCULATION RESULTS | FIRST STANDARD SOLUTION ABSORBANCE RANGE | Abs | 5750 | 6500 | 6600 | 6000 | 3800 | 5000 | ... |
| | VARIATION ALLOWABLE ABSORBANCE | % | 18 | 20 | 20 | 15 | 16 | 18 | ... |
| | | Abs | 80 | 100 | 100 | 100 | 110 | 100 | ... |
| | SENSITIVITY ALLOWABLE ABSORBANCE | Abs | 600 | 800 | 800 | 790 | 820 | 780 | ... |
| | CONVERGENCE ALLOWABLE ABSORBANCE | Abs | 150 | 180 | 80 | 150 | 100 | 200 | ... |

AUTOMATIC ANALYZER

TECHNICAL FIELD

The present invention relates to an automatic analyzer that conducts qualitative and quantitative analyses upon blood, urine, and other biological samples.

BACKGROUND ART

When a reagent to be used in an automatic analyzer for clinical laboratory tests is developed, optimal parameters are determined as a measuring wavelength, a reagent volume, a sample volume, an analytical method, and the like, from test results. The registration of the determined analytical parameters is applied for under the Pharmaceutical Affairs Act, and the parameters are registered. After the application for registration, the analytical parameters and formulation of the reagent cannot be easily changed under the Pharmaceutical Affairs Act.

Incidentally, a reaction tank is used to manufacture a reagent, and the volume of reagent that can be produced during one manufacturing operation is predetermined. This production volume is managed as one batch, and reagent bottles are filled in fixed quantities and sold. At this time, each reagent bottle is inscribed with the batch information and managed.

The reaction characteristics of a reagent intended to measure the concentration of a desired substance in a sample by utilizing chemical reactions such as an enzyme reaction and antigen-antibody reaction slightly differ according to factors such as the differences in the quantities of materials in the reagent and the time of the year when the reagent is formulated. The values of the reagent, such as sensitivity and the absorbance of a blank, therefore, vary from batch to batch.

In conventional automatic analyzers, the reagent volume, measuring wavelength, and other parameters subjected to pharmaceutical affairs application registration have been stored with a calibration result allowable range into a storage unit as analytical parameters for each measurement item. In this case, the analytical parameters have been assigned without allowable data changed on a reagent batch basis.

When the reagent is set in an automatic analyzer in order to analyze a patient sample, calibration takes place before the analysis of the patient sample to calibrate the automatic analyzer according to the particular composition of the reagent. It is currently common to perform corrections on a reagent batch basis by calibration for minimal differences in reaction characteristics between the produced reagent batches.

With regard to such differences in reaction characteristics between produced reagent batches, Patent Document 1 discloses an automatic analyzer that removes any differences in reaction characteristics between reagent batches by holding reagent bar codes with characteristic analytical parameters assigned for each reagent batch, and thereby measures data accurately without keyboard entry.

Recently, more detailed data checking than ever before has come to be required for clinical laboratory tests. Data-checking methods enable an allowable range to be set during apparatus parameterizing, and an alarm to be displayed upon detection of any data overstepping the allowable range.

Data-checking methods differ according to the reaction characteristics of the reagent used. For example, these differences relate to: a linearity check value, a prozone check value, reaction limit absorbance, and technical limits; and first standard solution absorbance, variation allowable absorbance, sensitivity allowable absorbance, and convergence allowable absorbance, each of which is associated with calibration measurement result checks.

It has been difficult with these checking methods to detect slight differences in chemical reaction, but the reaction process approximation method presented in Patent Document 2 allows determination based upon quantitative recognition of the differences between reagent batches and the differences in chemical characteristics between the reagents. Using this checking method to assess the quality of the reagents allows one to detect the differences in reaction characteristics between the reagent batches.

PRIOR ART LITERATURE

Patent Documents

Patent Document 1: JP-1996-262029-A
Patent Document 2: JP-2009-204448-A

SUMMARY OF THE INVENTION

Problems to be Solved by the Invention

To improve the reliability of an automatic analyzer with respect to measurement results, before these measurement results are reported to a doctor, there is a need to detect abnormal measurement results. The detection can be achieved if the analyzer has an ability to detect the data obtained when the measuring range corresponding to the reagent used, or variations or other such reagent-derived fluctuations as in the blank value which changes with the deterioration of the reagent overstep a fixed management value range.

The management value changes with the reagent batch. Accordingly, if the management value is registered as analytical parameters and the fixed data is set irrespective of batch changes, even when the data settings are appropriate for a reagent batch, a data alarm might be detected for individual values once the batch has been replaced by another batch.

The data for which the data alarms have been detected, however, may not necessarily all be abnormal. In addition, the reagents of the batch that have been used may not have all deteriorated. Conducting corrections by calibration or changing the data settings to the correct ones for each reagent batch is most likely to allow measurement to be continued.

In conventional automatic analyzers, however, there is a case in which, when a reagent is used in the automatic analyzer, the set value designated by the manufacturer of the reagent during the entry of the parameters for the analyzer may be set and used as the analytical parameters. In another case that an automatic analyzer uses a general-purpose reagent or the like for which a user enters and sets analytical parameters himself or herself, it has been necessary for the user to enter an appropriate set value based upon the measurement results obtained by, for example, assaying a control sample and/or a standard substance using the reagent, or upon the empirical data obtained from actual analytical operations.

Additionally, since the set values based upon the value designated from the reagent manufacturer are not the ones designated for each batch, these set values are not necessarily appropriate. Furthermore, in a case that the user is to enter and set the appropriate value, the user needs to update the set values with each change of the reagent batch, so that his/her job is heavily burdened, and these setting functions are currently not utilized.

Besides, the number of reagent batches used in one automatic analyzer is not always one for each analytical item, and there is a case in which the analysis of hundreds of samples is requested and reagent batches are changed during the sample measurements. In such a case, a function that executes calibration when the reagent batch is changed allows the correction based on batch-specific calibration.

In terms of analytical parameters, however, one parameter corresponds to one analytical item and when two or more reagent batches are present at the same time, and if two or more reagent batches exist simultaneously, the set values of the analytical parameters cannot be changed during the measurement process in which the apparatus is active.

For these reasons, the conventional techniques have had a problem in that the parameter data to be changed with a change of the reagent batch cannot be appropriately set.

An object of the present invention is to realize an automatic analyzer that allows appropriate setting of analytical parameters which incorporate batch-to-batch variations in characteristics of reagents.

Means for Solving the Problem

In order to attain the above object, the present invention is configured as follows.

An aspect of the present invention is an automatic analyzer that mixes a reagent into a sample and analyzes the sample, the analyzer including: fixed parameter information relating to reagent information on the reagent used, the fixed parameter information being determined by analytical items; storage means for storing therein variable parameters which vary with a production batch of the reagent, the storage means being required for assessment of measurement results on the sample; and a control unit configured to, by use of the fixed parameter information and variable parameter information stored in the storage means, control the mixing of the sample and the reagent and analytical operation of the analyzer for the sample.

Effects of the Invention

Embodiments of the present invention include an automatic analyzer which allows appropriate setting of analytical parameters associated with batch-to-batch variations in characteristics of reagents.

BRIEF DESCRIPTION OF THE DRAWINGS

FIG. 4 is a diagram showing an example of a display screen for the analytical parameters in the first embodiment of the present invention.

FIG. 5 is a diagram that shows data obtained when calibration is conducted on a reagent batch basis in the first embodiment of the present invention.

MODE FOR CARRYING OUT THE INVENTION

Hereunder, embodiments of the present invention will be described referring to the accompanying drawings.

First Example

A first embodiment of the present invention is described below taking as an example an automatic analyzer designed to process cassette-accommodated reagent bottles placed at a rate of one set for one cassette.

Figure 1:
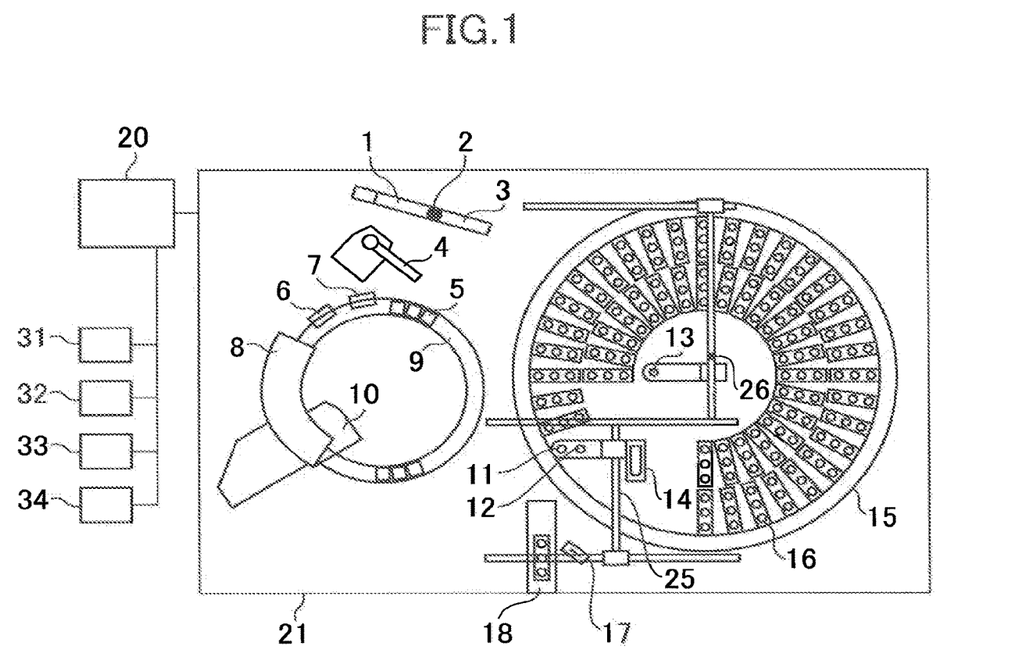
FIG. 1 is a schematic configuration diagram of an automatic analyzer to which the present invention is applied.

FIG. 1 is a schematic configuration diagram of the automatic analyzer to which the first embodiment of the present invention is applied. Referring to FIG. 1, on a cabinet 21, a plurality of reaction vessels 5 are arrayed circumferentially on a reaction disk 9.

A plurality of reagent cassettes 16 can be arranged circumferentially on each of reagent disks 15. One reagent cassette 16 can accommodate a maximum of three types of reagents (first to third reagents).

A transport mechanism 3 that moves a rack 1 with a sample container 2 rested thereupon is placed near the reaction disk 9. Rails 25 and 26 are arranged on the reagent disks 15, and a reagent probe 11 adapted to move in tri-axial directions, a reagent bottle-opening mechanism 12, and a reagent cassette transport mechanism 14 are set up above the rail 25.

In addition, a reagent probe 13 adapted to move in tri-axial directions is set up above the rail 26. The reagent probes 11, 13 connect to a reagent pump not shown.

New reagent cassettes are loaded from a reagent cassette loading port 18. Bar codes inscribed on each of the new reagent cassettes beforehand are read by a reagent bar-code reader 17.

A sample probe 4 formed to rotate and to move vertically is placed between the reaction vessels 5 and the transport mechanism 3. The sample probe 4 connects to a sample pump not shown. Stirrers 6 and 7, a light source and optical detector 10, and a vessel-cleaning mechanism 8 are arranged around the reaction disk 9. The vessel-cleaning mechanism 8 connects to a cleaning pump not shown.

The sample pump (not shown), the reagent pump (not shown), the cleaning pump (not shown), the light source and optical detector 10, the reaction disk 9, the reagent disks 15, the reagent probes 11, 13, and the sample probe 4 are each connected to a controller 20.

The transport mechanism 3 transports the rack 1 and after the sample probe 4 has aspirated a sample retained in the sample container 2 of the rack 1 and placed in a predetermined sample-aspirating position, the sample probe 4 releases the sample into a reaction vessel 5 of the reaction disk 9, at a sample-dispensing position.

The reaction disk 9 then rotates to move the reaction vessel 5 with the sample contained therein to a first reagent-dispensing position. At this position, the first reagent probe 11 dispenses a first reagent from one reagent cassette 16 retained on the reagent disk 15, into the reaction vessel 5. The reaction vessel 5 into which the first reagent has been dispensed is moved to a stirring position, where the stirrer 6 then stirs the sample and the first reagent.

Additionally, when a second reagent is to be added, the stirred reaction vessel 5 is moved to a second reagent-dispensing position, at which position the second reagent probe 13 then dispenses a second reagent, the same reagent as the first reagent retained on the reagent disk 15, from the reagent cassette 16 into the reaction vessel 5. The reaction vessel 5 containing the dispensed second reagent in addition to the first reagent is moved to a stirring position, at which position the stirrer 7 then stirs the sample, first reagent, and second reagent in the reaction vessel 5, thus generating a reaction solution.

The reaction vessel 5 with the reaction solution generated therein is moved to a measuring position, where the reaction vessel 5 then passes through a beam of light that has been emitted from a light source of the optical detector 10, and absorbance of the light at this time is detected by a multi-wavelength photometer which is a photometric mechanism 10 of the optical detector. An absorbance signal that has thus been created by the detection enters a control unit 33, which then converts the signal into a concentration signal of the sample. The control unit 33 simultaneously conducts data alarm checks based upon the absorbance.

The data that has been converted into the concentration signal is stored into a storage unit 32 and displayed on a display unit 34. The reaction vessel 5 that has been subjected to photometry is moved to the cleaning mechanism 8 and cleaned therein to be used for following analysis.

An operating unit 31 includes, for example, a keyboard and a CRT monitor, and is used to register measurement items as well as information on the sample to be analyzed, and to set analytical parameters and the like.

Figure 2:
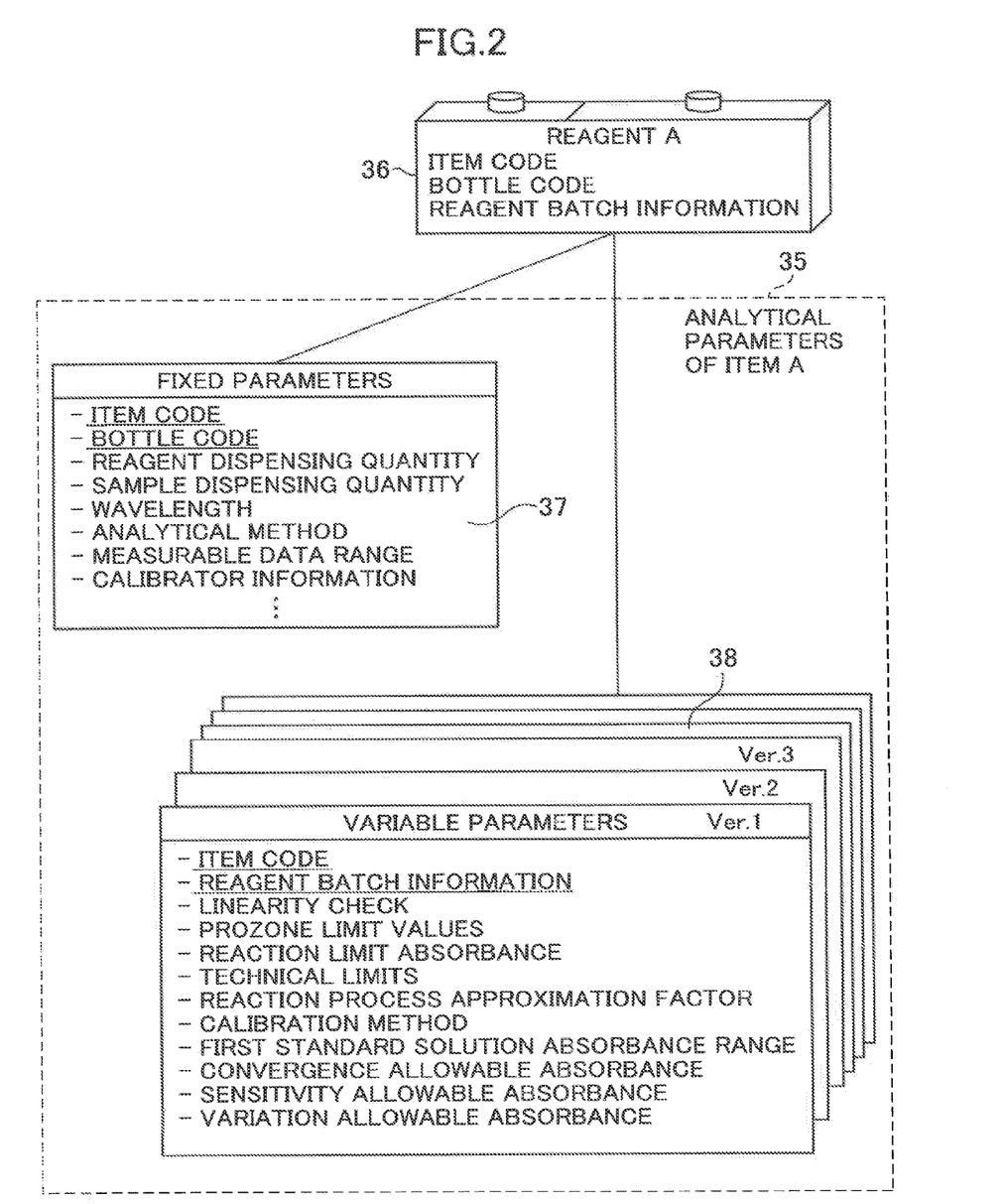
FIG. 2 is a data structural diagram of analytical parameters stored into a storage unit in a first embodiment of the present invention.

Next, a structure of the analytical parameters stored into the storage unit 32 is shown in FIG. 2. Referring to FIG. 2, information on the analytical parameters 35 is stored into the storage unit 32, and the analytical parameters 35 consist of fixed parameters 37 and variable parameters 38. Registered by way of example as the fixed parameters 37 are a reagent-dispensing quantity, a sample-dispensing quantity, measuring wavelength, and the like, and these values become a pivot for the measurement of the sample. Parameters to be used can be selected from the item code and bottle code information assigned to the reagent bottle 36.

Registered by way of example as the variable parameters 38 are: a linearity check value, a prozone check value, reaction limit absorbance, and technical limits, each of which is associated with general-sample measurement result checks; and first standard solution absorbance, variation allowable absorbance, sensitivity allowable absorbance, convergence allowable absorbance, and the like, each of which is associated with calibration measurement result checks.

In addition, depending upon reaction characteristics of the reagent, a method of calibration used may also be registered as one of the variable parameters 38. Furthermore, a parameter obtained through reaction process approximation may be more preferably added as one of the variable parameters 38.

The variable parameters 38 have a plurality of versions of variable parameter tables for one fixed parameter table, and under control from the control unit 33, recording-medium information such as the bar code information inscribed on the reagent bottle is read, whereby the item code, the bottle code, and batch information relating to the reagent are used as a key and the variable parameters of the version corresponding to the key are adopted.

Figure 3:
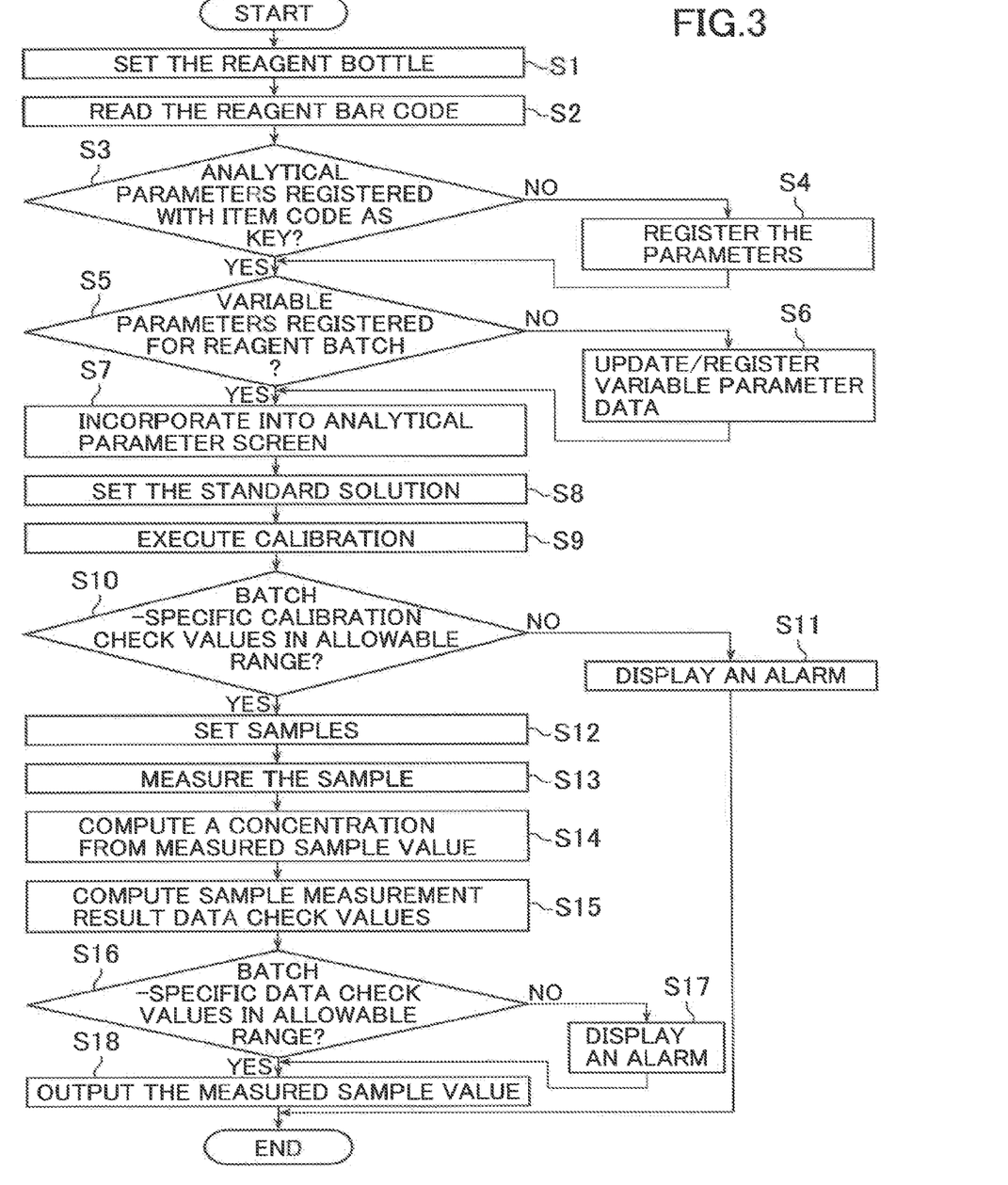
FIG. 3 is a flowchart of an operational sequence from reagent setting to measurement result output, in the first embodiment of the present invention.

FIG. 3 is a flowchart of an operational sequence from setting of one reagent cassette 16 to output of measurement results. The control unit 33 controls the sequence.

Referring to FIG. 3, when the reagent cassette (reagent bottle) 16 is set up on the reagent disk 15 in the automatic analyzer (step S1), the reagent bar-code reader 17 reads the bar code information assigned to the reagent bottle 16 (step S2).

The item code of the reagent is added to the bar code information recorded on a recording medium accompanying the reagent cassette 16. The control unit 33, therefore, determines whether analytical parameters are registered in the storage unit 32 with the reagent item code as a key (step S3).

If determination results in step S3 are negative (NO), that is, if analytical parameters are not registered in the storage unit 32, analytical parameters are registered therein (step S4). In this step, if the information assigned to the reagent bottle 16 contains analytical parameters, the parameter information can also be stored into the storage unit 32 of the apparatus automatically where necessary. After the parameter registration, process control proceeds to step S5.

If the determination results in step S3 are positive (YES), that is, if analytical parameters are registered in the storage unit 32, the control unit 33 next determines whether variable parameters are registered in the storage unit 32 with the registered reagent batch number as a key (step S5).

If determination results in step S5 are negative (NO), that is, if variable parameters 38 are not registered in the storage unit 32, variable parameter information is stored into the storage unit 32 (step S6).

At this time, variable parameter data corresponding to individual reagent batches may be acquired from a server supplied from a manufacturer of the reagent, via a communication network connected to the automatic analyzer. In addition, if the information assigned to the reagent bottle 16 contains variable parameter information, this parameter information may be stored into the storage unit 32 of the apparatus automatically where necessary. Furthermore, a user can assign variable parameter information directly.

If the determination results in step S5 are positive (YES), that is, if variable parameters are registered in the storage unit 32, only the reagent batch information corresponding to the reagent cassette 16 set up in the automatic analyzer is incorporated from the plurality of variable parameters of information stored within the storage unit 32, into an analytical parameter screen of the display unit 34 (step S7).

Next, a standard solution is set (step S8) and then calibration is conducted (step S9). Calibration execution results are next checked against a calibration check value that varies from batch to batch of the reagent, and thus whether the calibration execution results fall within an allowable range is determined (step S10).

If calibration check results in step S10 are negative (NO), that is, if the calibration check results are not within the allowable range, an alarm is displayed (step S11) to complete the sequence.

If the calibration check results in step S10 are positive (YES), that is, if the calibration check results are within the allowable range, samples to be analyzed are set (step S12) and then a control sample and a general sample are analyzed (step S13).

After measurement of absorbance by the optical detector 10, the calibration results are used to compute a concentration from the measured value (step S14). Data check values such as a prozone value and a reaction process approximation factor are also computed after completion of each sample measurement (step S15).

Measurement results are checked against the values that were obtained in steps S14, S15, and thereby whether the measurement results lie in the allowable range of the data check values is determined with the batch number of the reagent as a key (step S16).

If determination results in step S16 are negative (YES), that is, if the measurement results are not within the allowable range of the data check values, an alarm is displayed (step S17) and then the measured sample data is output to the display unit 34 (step S18). This completes the sequence.

If the determination results in step S16 are positive (NO), that is, if the measurement results are within the allowable range of the data check values, the determination results are displayed with the measured values, on the display unit 34 (step S18). At this time, the measurement results may be displayed on the display unit 34 in such a form as will enable the operator to readily identify the reagent batch corresponding to the results.

The way to store the information relating to the analytical parameters 35 into the storage unit 32 of the automatic analyzer may be such that when the reagent manufacturer sells a new batch of reagents, the manufacturer either registers the information by delivering it to automatic analyzers within individual laboratory test rooms via the Internet, or assigns the information to reagent bottles in a form of, for example, a bar code, a QR code, or an IC chip.

Yet another system may be such that in a case of the information being assigned to each reagent bottle in the form of a bar code or the like, when the reagent bottle is set in the automatic analyzer, the information is stored into the storage unit 32 of the apparatus. In a further preferable scheme, a plurality of variable parameters 38 will be storable into the storage unit 32 at the same time for each item code and the variable parameters 38 to be adopted will be selectable from the reagent batch information, for each sample measurement operation.

In addition, the variable parameters 38 that have been stored will be replaced by newly registered ones each time the reagent batch is changed, and if a desired batch is not used for a fixed time period in the apparatus, the parameter information will be deleted in order with the oldest information first.

FIG. 4 is a diagram showing an example of a display screen for the analytical parameters in the automatic analyzer according to the first embodiment of the present invention.

Referring to FIG. 4, selection of an item from a list 39 of item names registered in the automatic analyzer displays analytical parameters at the right of the screen. The analytical parameter screen is divided into sheets or the like according to the particular kind of analytical parameter, and includes a screen 40 provided to set the parameters fixed on a reagent item basis, such as those relating to analysis and calibration, and the characteristic parameters of the particular laboratory test room. The analytical parameter screen also includes a screen 41 that allows setting of the variable parameters which change for each reagent batch.

The variable-parameter setting screen 41 retains a plurality of batches of information and includes radio buttons 42 or the like to allow information selection for confirming the parameters corresponding to each batch. Of the plurality of sets of information registered, desired reagent information 43 that includes, for example, the item code, bottle code, batch and sequence numbers, and expiry date of the reagent, can be displayed for each batch of the reagent.

Of the variable-parameter screen 41, a calibration result check value 44 and a measured-data check value 45 are displayed in detail. The data of the two kinds is preferably displayed so that when the reagent is set in the automatic analyzer, the variable-parameter information stored within the storage unit 32 will be displayed automatically referring to the item code, batch number, and other information bar-coded on the reagent bottle. Additionally or alternatively, a data edit button 46 may be disposed to enable a user of an administrator level to edit set values.

As described above, the apparatus in the first embodiment of the present invention is configured so as to read the item code, bottle code, and reagent batch information assigned to the reagent bottle 36. The apparatus is also configured so as to store the read information into the storage unit 32 independently for each of the two kinds of parameters, namely the fixed parameters that relate to measurement and do not vary from batch to batch of the reagent, and the variable parameters that relate to measurement result checks and vary from batch to batch of the reagent. The apparatus is further configured so as to determine whether the information assigned to a new reagent bottle has been stored in the storage unit 32, and store the information if it is not stored.

Thus, measurement result checks can be conducted in definite distinction between a reagent bottle relating to the same reagent batch, and a reagent bottle relating to a different reagent batch.

In other words, if an independent value is assigned for each batch of the reagent and the value can be adopted for use in the apparatus, this enables reagent-derived data alarms to be appropriately detected and thus the user to avoid overlooking abnormal data and reporting the wrong measurement results to a doctor.

In addition, the parameter value settings based upon the information assigned to the reagent bottle are stored into the apparatus automatically, which saves keyboard entry time and labor and eliminates operational mistakes in entry.

The appropriate detection of reagent-derived value alarms facilitates isolation of apparatus-derived abnormalities and management of the apparatus state or condition, so there is a great advantage for maintenance by a manufacturer of the apparatus. The above also enables the manufacturer of the reagent to enter and set values on a batch basis in advance, present the reaction characteristics of the reagent in advance, and provide a scope of guarantee for the reagent of the batch. As a result, the manufacturer can prevent a data alarm due to a deviation in a management value from occurring during data checks, and in response to a user inquiry about abnormal data, pursue/estimate probable causes of the abnormal data from the reaction characteristics of the batch.

Second Embodiment

Next, a second embodiment of the present invention is described below.

The second embodiment of the present invention is substantially the same as the first embodiment in terms of both the apparatus configuration shown in FIG. 1, and the process steps shown in FIG. 3. Detailed description of the apparatus configuration and the process steps is therefore omitted herein.

The second embodiment of the present invention relates to an example in which the calibration check value calculated in steps S9 and S10 of FIG. 3 is used for the control unit 33 to manage accuracy of the reagent and the apparatus in addition to changes in a calculated value over time.

While it has been described in the first embodiment that a plurality of variable parameters 38 are stored and that information on the reagent batches whose usage durations have exceeded a fixed term is deleted, the apparatus configuration in the second embodiment allows the user to readily confirm changes in the quality of the reagent by storing the plurality of values of the variable-parameters 38 for a long period of time and displaying time-varying (batch-by-batch) changes in data.

In steps S9 and S10 of FIG. 3, for example, when calibration takes place, absorbance of the standard solution is measured and a calibration curve is created. The following four values that were entered as calibration check data items in these steps are calculated: (1) first standard solution allowable absorbance, (2) variation allowable absorbance, (3) sensitivity allowable absorbance, and (4) convergence allowable absorbance.

Briefly as shown in FIG. 5, variable parameters 48 and the check value 50 calculated from calibration results are obtained for each reagent batch 47 and each calibration execution date 49.

The control unit 33 compares the calculated check value with the previously set allowable value, and in step S11 of FIG. 3, displays an alarm for any values overstepping the allowable range. At this time, the calculated value and the previously set value are displayed on one graph, for each calibration execution date or for each reagent batch. The calculated value is stored into the storage unit 32 along with the allowable values of the variable parameters for each reagent batch.

The following describes the management of the first standard solution allowable absorbance, variation allowable absorbance, sensitivity allowable absorbance, and convergence allowable absorbance, each of which is an independent variable parameter.

(1) Management of the First Standard Solution Allowable Absorbance

First, an absorbance range of the first standard solution to be used for calibration is set. In most cases, this management value is that of an analyte-free blank, so that this value denotes a magnitude of the absorbance of the reagent itself.

Figure 6:
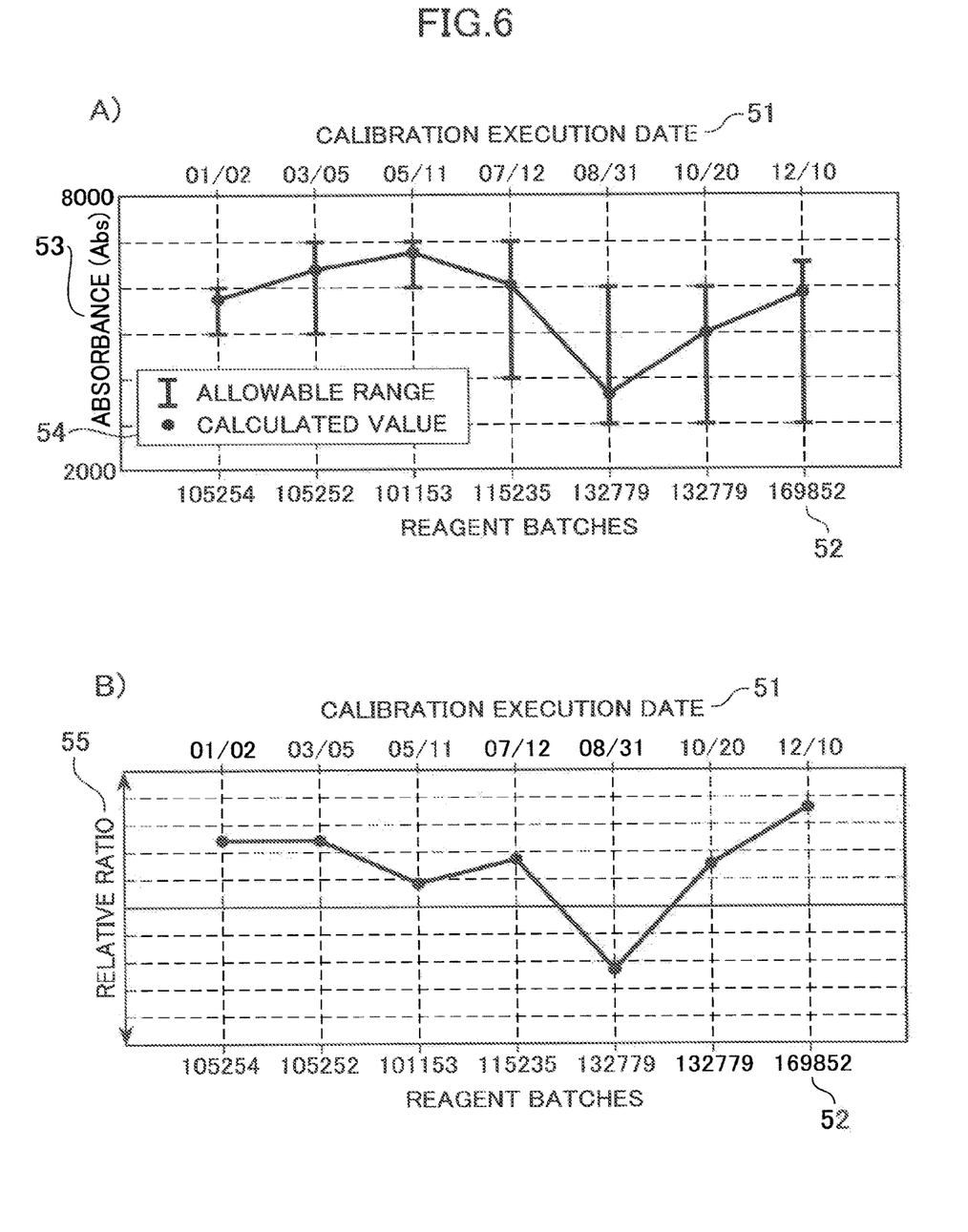
FIG. 6 is a diagram showing an example of a display screen for managing changes in calibration check values with time in a second embodiment of the present invention.

FIG. 6 is a diagram showing an example of a display screen created when this management value is used for accuracy management.

Referring to FIG. 6, graph (A), calibration execution dates 51 are plotted on a horizontal axis, and the batches 52 of the reagent that were used on the respective dates are also shown. Absorbance 53 is plotted on a vertical axis of FIG. 6, graph (A), and the allowable ranges (upper-limit values and lower-limit values) that were set for each reagent batch, and the first standard solution absorbance 50 that was calculated during calibration are also plotted. The allowable ranges and the calculated values are displayed in such a format as of a legend 54.

Since time-varying changes in the set values for the reagent are managed in this way, the user can confirm changes in the quality of the reagent, for each reagent batch. In addition, since the automatic analyzer displays an alarm automatically for any deviations from the allowable value range, the user can readily confirm what value has deviated from the allowable range on what day, for what reagent batch, and to what extent.

Additionally, since the user can confirm where in the allowable range the calibration result value exists, he/she can verify whether the value, when compared with the allowable value presented from the reagent manufacturer, is too large or too small.

This value may, as shown in graph (B) of FIG. 6, be displayed so that a vertical axis denotes a relative ratio 55 of the calculated value with respect to the management allowable range. Making this display allows relative assessment of where in the allowable range the calibration results are located, without impacts of variations or the magnitude of the allowable range which changes with the reagent batch.

The absorbance of the first standard solution changes according to particular composition of the reagent and is also affected by the apparatus (optical system) being used.

It can be seen from graph (B) of FIG. 6 that the automatic analyzer being used has the apparatus characteristics that the value measured for each reagent batch will always be a trifle large in the allowable data presented from the reagent manufacturer.

If the relative ratio is slightly low, this implies, for example, that a lamp in the optical system of the automatic analyzer may have deteriorated or that the characteristics of the apparatus may have deteriorated. In addition, in a case that calibration is set so that although the same reagent batch is used, only blank calibration is conducted when bottle changes take place, the deterioration of the reagent in the new bottle is likely to be detectible.

(2) Management of Variation Allowance Absorbance

Allowable values for variations in double-measurement results between standard solutions are set in terms of percentage or absorbance. In this case, as shown in FIG. 6, calibration execution dates 51 and reagent batches 52 are plotted on a horizontal axis of a graph displayed on the screen, and corresponding allowable values and the value calculated from following expressions (1) and (2) after calibration has been executed are plotted on a vertical axis, with absorbance being shown as A in expressions (1), (2):

$$([A_{STD(N)}(\text{1st time}) - A_{STD(N)}(\text{2nd time})]/[A_{STD(N)}(\text{1st time}) + A_{STD(N)}(\text{2nd time})]/2*100 \quad (1)$$

$$[A_{STD(N)}(\text{1st time}) - A_{STD(N)}(\text{2nd time})] \quad (2)$$

where the square brackets ([ ]) denote an absolute value in expressions (1), (2).

(2) Management of Sensitivity Allowance Absorbance

Differences between the absorbance of first standard solutions and that of span points are set. Sensitivity allowance absorbance is calculated from expression (3) shown below, and this absorbance is checked whether it lies in the allowable range of the upper-limit values and lower-limit values that have been set for each reagent batch. The plottings of the sensitivity allowance absorbance for each reagent batch, on the screen display, are preferably displayed in the same format or pattern as that of FIG. 6. Character C in expression (3) below denotes concentrations of each standard solution.

$$A_{STD(N)} - A_{STD(1)}/C_{STD(N)} - C_{STD(1)} \quad (3)$$

(4) Management of Convergence Allowance Absorbance

Standard deviations (SDs) of differences between approximated absorbance and measured absorbance, with respect to the concentrations of standard solutions, on a nonlinear calibration curve and a linear (multipoint) calibration curve, are set up.

This check value is preferably displayed in substantially the same format or pattern as that of the sensitivity allowance absorbance described as item (3) above.

As set forth above, if the calibration check value that has formerly not been used for management is managed in time-series form over a long period of time, since the apparatus states that have been assessed from measurement results obtained using accuracy management samples are managed, calibration results can also be used to confirm the quality of the reagent and to detect changes in apparatus state.

The second embodiment of the present invention yields substantially the same advantageous effects of the first embodiment. The second embodiment also enables calibration results to be used to confirm the quality of the reagent and to detect changes in apparatus state over time, since the apparatus is configured so that a plurality of variable parameters are stored into the storage unit 32 and the calibration check value that has formerly not been used for management is managed in time-series form over a long period of time.

As described in the first embodiment and second embodiment of the present invention above, the management of measurement results in the automatic analyzer applying the invention is more optimized than in automatic analyzers based upon conventional techniques. In addition, the automatic analyzer applying the invention contributes to reagent quality control, apparatus state management, and more, and is expected to improve reliability of the measurement using the automatic analyzer.

In accordance with the present invention, therefore, the automatic analyzer of the invention is expected to assist the operator in saving his/her own labor, by automating his/her entry operations as well as by contributing to improving reliability of the analyzer-aided data measurement as viewed in terms of the user's convenience, the apparatus characteristics, and the reagent characteristics.

DESCRIPTION OF REFERENCE NUMBERS

1 . . . Sample rack, 2 . . . Sample container, 3 . . . Rack transport line, 4 . . . Sample-dispensing probe, 5 . . . Reaction vessel, 6, 7 . . . Stirrers, 8 . . . Cleaning mechanism, 9 . . . Reaction disk, 11, 13 . . . Reagent-dispensing probe, 12 . . . Reagent bottle-opening mechanism, 14 . . . Cassette transport mechanism, 15 . . . Reagent disk, 16 . . . Reagent cassette, 17 . . . Reagent bar-code reader, 18 . . . Reagent cassette loading port, 20 . . . Controller, 31 . . . Operating unit, 32 . . . Storage unit, 33 . . . Control unit, 34 . . . Display unit, 35 . . . Analytical parameter, 36 . . . Reagent bottle, 37 . . . Fixed parameter, 38 . . . Variable parameter, 39 . . . Item list, 40 . . . Fixed parameter, 41 . . . Variable parameter, 42 . . . Radio button for reagent batch selection, 43 . . . Reagent information, 44 . . . Calibration check value, 45 . . . Data check value, 46 . . . Data registration button, 47 . . . Reagent batch, 48 . . . Variable parameter set values, 49 . . . Calibration execution date, 50 . . . Calibration-derived calculations check value, 51 . . . Horizontal axis (Calibration execution date), 52 . . . Horizontal axis (Reagent batch), 53 . . . Absorbance, 54 . . . Legend, 55 . . . Relative ratio

The invention claimed is:

1. An automatic analyzer configured to perform an absorbance measurement of a biological sample by analyzing a mixture of at least two reagents and the biological sample, the analyzer comprising:
a reaction disk constructed to hold a plurality of reaction vessels;
a sample probe adapted to aspirate the biological sample and to release the biological sample into one of said plurality of reaction vessels;
a first reagent probe configured to move in a tri-axial direction to obtain a first reagent from a first reagent container, and a second reagent probe configured to move in the tri-axial direction to obtain a second reagent from a second reagent container, the first and second reagent containers being disposed in a reagent disk, the first and second reagent probes dispensing a respective reagent into (i) said reaction vessel to form the mixture of the biological sample, the first reagent and the second reagent, to form a reaction solution including the first and second reagents;
a reader constructed to receive reagent information encoded on the first and second reagent containers;
an optical detector configured to obtain (i) a calibration measurement comprising an absorbance signal of the reaction solution including the first and second reagents by detecting an amount of light that passes through said reaction vessel containing the reaction solution, and (ii) the absorbance measurement of the biological sample by detecting an amount of light that passes through said reaction vessel containing the reaction solution;
a control unit configured to read, using said reader, said reagent information assigned to the first and second reagent containers accommodating the respective reagent;
a storage unit storing therein the reagent information; and
a display unit configured to display an alarm,
wherein the control unit is further configured
to register, in the storage unit, a calibration check value and a variable parameter, for each of a first batch of said first reagent and a first batch of said second reagent, for a variation allowance absorbance, a sensitivity allowance absorbance and a convergence absorbance,
wherein the calibration check value for variation allowance absorbance is based on a difference in corresponding variable parameters for absorbance between the first batch of said first reagent of the reaction solution at a first calibration execution date and a second batch of said first reagent of the reaction solution at a second calibration execution date, and a difference in corresponding variable parameters for absorbance between the first batch of said second reagent of the reaction solution at a first calibration execution date and a second batch of said second reagent of the reaction solution at a second calibration execution date, the first calibration execution date being different from the second calibration execution date,
wherein the calibration check value for sensitivity allowance absorbance is based on a difference in both concentration and the absorbance between corresponding variable parameters for the first batch of said first reagent of the reaction solution at the first calibration execution date and the second batch of said first reagent of the reaction solution at the second calibration execution date, and between corresponding variable parameters for the first batch of said second reagent at the first calibration execution date and the second batch of said second reagent of the reaction solution at the second calibration execution date, and
wherein the calibration check value for convergence absorbance is based on a difference between corresponding variable parameters for an approximated absorbance and a measured absorbance at different concentrations, and
to determine if the optical detector of the automatic analyzer or a quality of the first and second reagents has deteriorated based on a comparison of the calibration check value to standard solution absorbance values which are received from a manufacturer, for each production batch of the first and second reagents, wherein the changes in absorbance for each production batch of the first and second reagents over time correspond to changes in the quality of the first and second reagents, and wherein the display unit displays the alarm, if one of the calibration check values is not within a corresponding allowable range of the standard solution absorbance values.

2. The automatic analyzer according to claim 1, wherein the control unit is further configured to register a data check value in the storage unit, wherein the data check value is at least one selected from the group consisting of a linearity check value, a prozone check value, a reaction limit absorbance, and technical limits.

3. The automatic analyzer according to claim 1, wherein the display unit is configured to display the standard solution absorbance values for each production batch of the first and second reagents, the calibration measurement for each production batch of the first and second reagents, and a period in which the calibration was performed.

* * * * *